L. T. BURTRAW.
CAR SEAL CARRIER.
APPLICATION FILED MAY 8, 1916.
1,219,623.
Patented Mar. 20, 1917.
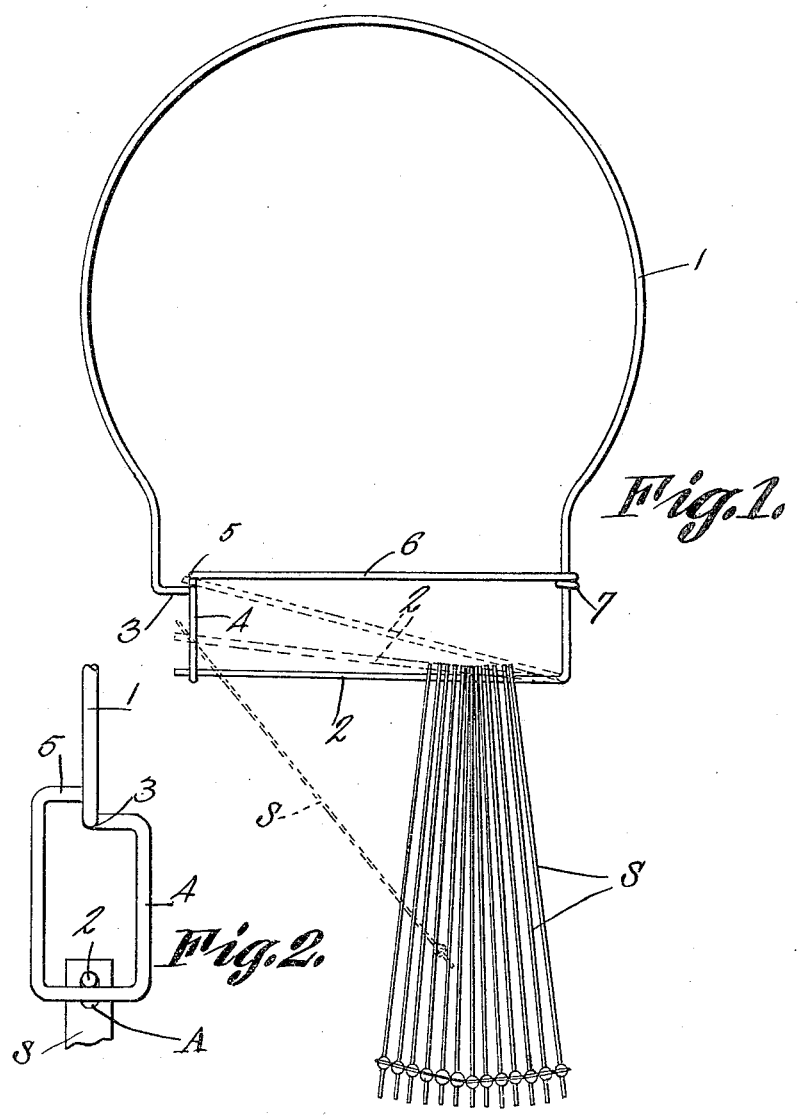

UNITED STATES PATENT OFFICE.

LYMAN T. BURTRAW, OF MARCELLUS, MICHIGAN.

CAR-SEAL CARRIER.

1,219,623.

Specification of Letters Patent.

Patented Mar. 20, 1917.

Application filed May 8, 1916. Serial No. 96,163.

*To all whom it may concern:*

Be it known that I, LYMAN T. BURTRAW, a citizen of the United States, residing at Marcellus, in the county of Cass and State of Michigan, have invented a new and useful Car-Seal Carrier, of which the following is a specification.

The present invention is a device for carrying car-seals or equivalent elements, and aims to provide a novel and improved carrier adapted to receive a plurality or series of car seals in regular order, to maintain them in such order, and to enable the seals to be removed one at a time in succession, whereby the device permits of the seals being conveniently handled without confusion or the loss of seals.

It is also the object of the invention to provide an implement of the nature indicated, which is extremely simple and inexpensive in construction, the same being readily formed from wire or equivalent stock, and which is light and indestructible, as well as being practical and efficacious for the protection and care of the seals.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the device showing a plurality of seals applied thereto.

Fig. 2 is an enlarged fragmental view illustrating the loop of the device.

Fig. 3 is a fragmental elevation illustrating a modification.

The device can be and preferably is constructed from a single length of resilient or spring wire, or equivalent stock, and embodies a relatively large bail or loop-shaped handle 1 for manipulating the carrier, said handle 1 being adapted to be readily slipped upon the arm of the freight agent or other person, in order that the seals can be conveniently carried about. The handle 1 is provided at one end with an angularly extending resilient tongue 2 projecting across the mouth of the loop-shaped handle, and the other end of the handle 1 is provided with an inwardly projecting portion 3 above the free end of the tongue 2, it being assumed that the carrier is in vertical position as when carried upon the arm. From the portion 3, the wire is bent into a rectangular loop 4 completely surrounding the free terminal of the tongue 2, and that terminal of the loop 4, designated 5, farthest remote from the portion 3 is disposed above said portion 3 and is spaced slightly therefrom to provide an entrance throat to the space within the loop 4. From the terminal 5 of the loop 4, the wire extends between the terminals of the handle 1 to provide a yoke 6 approximately parallel with the tongue 2 and connecting the loop 4 with the opposite terminal of the handle 1, said yoke 6 having that end thereof remote from the loop 4 coiled or bent around the handle 1, as at 7, or the yoke 6 may be welded, soldered or otherwise secured to the handle. The yoke 6 braces the loop 4, and prevents the terminals of the handle from being displaced. The yoke 6 also coöperates with the handle 1 to provide an arm receiving ring or band. The tongue 2 has a tension causing the free terminal thereof to bear against the lower end of the loop 4, when said tongue is free.

In using the carrier, to apply the strap or ribbon seals S to the carrier, the tongue 2 is sprung or pressed toward the yoke 6, and is moved transversely to move the free end of the tongue between the portions 3 and 5, whereby the tongue can be moved away from the loop 4. This permits the seals S to be applied readily to the tongue 2 and in series or in regular order. The tongue 2 is now returned within the loop 4, as seen in full lines in Fig. 1, and since the loop 4 completely surrounds the free terminal of the tongue 2, the seals S cannot become lost. The seals can be removed one at a time in succession from the tongue 2 which projects through the apertures A in the ends of the seals. Thus, the seal nearest the loop 2 is moved toward said loop, and the apertured end of the seal is then moved through the loop 4, as indicated in dotted lines in Fig. 1, the tongue 2 being swung upwardly, and then by moving the seal longitudinally of itself, it can be moved out of engagement with the terminal of the tongue 2, and can then be withdrawn from the loop 4. It is thus possible to remove the seals one at a time without the liability of disarranging or losing any of the remaining ones. The present device saves time in the handling of the seals, has no parts which are liable to get out of order, and is able to withstand hard usage.

In the modified form illustrated in Fig. 3, the wire is extended downwardly, as at 8, from the coil or point 7 which is secured to one terminal of the handle 1, and from the portion 8 is extended across to the other terminal of the handle and terminates within the loop 4, to provide a secondary tongue 9 parallel with or adjacent the tongue 2. Two tongues can thus be provided for holding two sets of seals or other elements.

Having thus described the invention, what is claimed as new is:

1. A carrier having a loop, and a tongue whose free terminal projects within said loop, said loop surrounding said tongue and having a throat for the passage of the tongue into and out of the loop, and said loop being adapted to receive elements carried by the tongue to enable said elements to be removed from the terminal of the tongue.

2. A carrier embodying a handle member provided at one end with a loop and at the other end with a tongue, said loop surrounding the terminal of said tongue and having a throat for the passage of the tongue into and out of said loop, said loop being adapted to receive elements carried by said tongue to enable the elements to be removed from the terminal of said tongue within the loop.

3. A carrier embodying a loop-shaped handle member formed from a single length of wire and having a loop at one end and a tongue at its other end, said loop surrounding the terminal of said tongue and having a throat for the passage of said tongue into and out of the loop, and said loop being adapted to receive elements held by said tongue to permit said elements to be removed from the terminal of the tongue within the loop.

4. A carrier embodying a handle having an inwardly projecting portion at one end and a loop carried by said portion and having a terminal spaced from said portion to provide an entrance throat, the handle having a tongue projecting from its other end, the free terminal of the tongue projecting within said loop, said loop being adapted to receive elements carried by said tongue to enable the elements to be removed from the terminal of said tongue within the loop.

5. A carrier formed from a single length of wire or equivalent stock embodying a loop-shaped handle having a tongue projecting from one end, an inwardly projecting portion at its other end, and a loop carried by said portion and surrounding the terminal of said tongue, said loop having a terminal adjacent said portion to provide an entrance throat for the tongue, said loop being adapted to receive elements carried by said tongue to enable the elements to be removed from the terminal of said tongue within the loop.

6. A carrier embodying a loop-shaped handle having a resilient tongue extending from one end to the other, the last mentioned end of the handle having an inwardly projecting portion, said portion having a loop surrounding the terminal of said tongue and terminating in a portion above the aforesaid portion to provide an entrance throat for said loop, and a yoke extending from the second mentioned portion to the opposite terminal of the handle and secured thereto, said loop being adapted to receive elements carried by said tongue to enable the elements to be removed from the terminal of said tongue within the loop.

In testimony that I claim the foregoing as my own, I have hereto affixed my signature in the presence of two witnesses.

LYMAN T. BURTRAW.

Witnesses:
JOEL J. NASH,
CHARLES WELCHER.

Copies of this patent may be obtained for five cents each, by addressing the "Commissioner of Patents, Washington, D. C."